United States Patent [19]
Ogawa et al.

[11] 4,201,809
[45] May 6, 1980

[54] MAGNETIC RECORDING MEDIUM

[75] Inventors: Hiroshi Ogawa; Yasuo Tamai, both of Odawara, Japan

[73] Assignee: Fuji Photo Film Co., Ltd., Minami-ashigara, Japan

[21] Appl. No.: 925,694

[22] Filed: Jul. 18, 1978

[30] Foreign Application Priority Data

Jul. 20, 1977 [JP] Japan .................................. 52-86132

[51] Int. Cl.$^2$ ............................................. H01F 10/02
[52] U.S. Cl. ............................. 428/65; 179/100.1 B; 252/62.54; 252/25; 252/56 R; 252/565; 358/128.5; 360/134; 360/135; 427/128; 428/64; 428/432; 428/469; 428/480; 428/523; 428/539; 428/411; 428/337; 428/900
[58] Field of Search .................... 428/900, 64, 65, 480, 428/469, 432, 523, 539, 411, 337; 252/62.54, 25, 56 R, 565; 360/134, 135; 179/100.1 B; 358/128; 427/128

[56] References Cited

U.S. PATENT DOCUMENTS

| | | | |
|---|---|---|---|
| 2,654,681 | 10/1953 | Lueck | 428/900 |
| 3,470,021 | 9/1969 | Hendricx | 428/900 |
| 3,471,415 | 10/1969 | Friedman | 252/62.54 |
| 3,497,411 | 2/1970 | Chebinak | 428/900 |
| 3,525,694 | 8/1970 | Bisschops | 252/62.54 |
| 3,630,772 | 12/1971 | Seidel | 428/900 |
| 3,634,253 | 1/1972 | Akashi | 252/62.54 |
| 3,993,824 | 11/1976 | Shirahata | 428/900 |

FOREIGN PATENT DOCUMENTS

| | | | |
|---|---|---|---|
| 41-18062 | 10/1966 | Japan | 427/128 |
| 41-18064 | 10/1966 | Japan | 427/128 |
| 43-00186 | 1/1968 | Japan | 428/900 |
| 43-00669 | 1/1968 | Japan | 427/128 |
| 47-15624 | 5/1972 | Japan . | |
| 48-27867 | 8/1973 | Japan . | |
| 49-28982 | 7/1974 | Japan . | |

*Primary Examiner*—Ellis P. Robinson
*Attorney, Agent, or Firm*—Armstrong, Nikaido, Marmelstein & Kubovcik

[57] ABSTRACT

This invention relates to a magnetic recording medium having on a non-magnetic support a magnetic layer comprising a ferromagnetic powder dispersed in a binder, in which the magnetic layer contains a compound represented by the following general formula (I), $$R+O-C-R')_n \qquad (I)$$
$$\phantom{R+O-}\|$$
$$\phantom{R+O-}O$$

wherein R represents a residual radical of trimethylolethane, trimethylolpropane or pentaerythritol, R' represents a residual radical of a fatty acid having at least 5 carbon atoms and n represents an integer of 2 to 4.

14 Claims, 1 Drawing Figure

U.S. Patent May 6, 1980 4,201,809
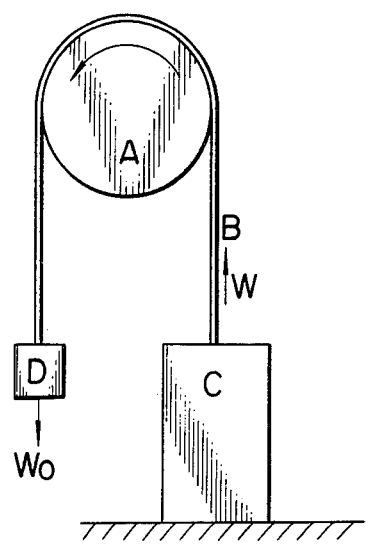

MAGNETIC RECORDING MEDIUM

BACKGROUND OF THE INVENTION

1. Field of the Invention

This invention relates to a magnetic recording medium and more particularly, it is concerned with a high density magnetic recording medium with an excellent lubricating property and durability.

2. Description of the Prior Art

A magnetic recording medium, in particular, video tape travels in contact with a fixed magnetic head, drum, guide pole, etc., and, therefore, it is required that such a magnetic recording medium has a small coefficient of friction and travels smoothly and stably for a long time. Furthermore, the magnetic recording medium should have an excellent durability since it is strongly rubbed by a revolving magnetic head.

To this end, it has hitherto been carried out to add higher fatty acids, esters of higher fatty acids with monohydric alcohols, dihydric alcohols or glycerol, paraffin hydrocarbons, silicone oils and the like. These lubricants are described in Japanese Patent Publication Nos. 18064/1966, 186/1968, 669/1968 and 15624/1972, and U.S. Pat. Nos. 2,654,681, 3,470,021, 3,497,411, 3,525,694 and 3,634,253. Of the above described lubricants, esters of higher fatty acids with monohydric alcohols, dihydric alcohols or glycerols are preferably used because of their effects and cheapness. The use of these lubricants, however, results in a high coefficient of friction of a video tape under a high loading and an insufficient durability.

SUMMARY OF THE INVENTION

It is an object of the present invention to provide a new magnetic recording medium whereby the disadvantages of the prior art can be overcome.

It is another object of the present invention to provide a magnetic recording substance having an excellent slidability as well as a stable tape running property.

It is a further object of the present invention to provide a magnetic recording medium excellent in abrasion resistance as well as durability.

These objects can be attained by a magnetic recording medium having on a non-magnetic support a magnetic layer comprising a ferromagnetic powder dispersed in a binder, in which the magnetic layer contains a compound represented by the following general formula,

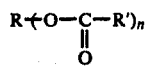

wherein R represents a residual radical of trimethylolethane, trimethylolpropane or pentaerythritol, R' represents a residual radical of a fatty acid having 5 or more carbon atoms and n represents an integer of 2, 3 or 4.

BRIEF DESCRIPTION OF THE DRAWING

The FIGURE is a schematic view of an apparatus for measuring the coefficient of kinematic friction in one embodiment of the present invention, in which A, B, C, D, Wo and W are respectively a drum, sample tape, tension detecting section, load weight, load by weight D and tension.

DETAILED DESCRIPTION OF THE INVENTION

The inventors have made studies on various lubricants and have found that very excellent results can be obtained when a polyol ester represented by the following general formula (I) is used as a lubricant. That is to say, the present invention provides a magnetic recording medium having on a non-magnetic support a magnetic layer comprising a ferromagnetic powder dispersed in a binder, in which the magnetic layer contains a compound represented by the following general formula (I),

in which R represents a residual radical of trimethylolethane, trimethylolpropane or pentaerythritol, R' represents a radical of fatty acid having 5 or more carbon atoms and n represents an integer of 2, 3 or 4.

R' in the compound of the present invention represented by the above described general formula (I) is an alkyl or alkenyl group having 5 to 17 carbon atoms, preferably 5 to 12 carbon atoms, more particularly, a residual radical of a saturated fatty acid such as caprylic acid (n-octanoyl), pelargonic acid (n-nonanoyl), capric acid (n-decanoyl), undecylic acid (n-undecanoyl), lauric acid (n-dodecanoyl), tridecylic acid (n-tridecanoyl), myristic acid (n-tetradecanoyl), pentadecylic acid (n-pentadecanoyl), palmitic acid (n-hexadecanoyl), heptadecylic acid (n-heptadecanoyl) or stearic acid (n-octadecanoyl), a residual radical of an unsaturated fatty acid such as lauroleic acid (9-dodecenoyl), zoamaric acid (9-hexadecenoyl), petroselinic acid (6-octadecenoyl), oleic acid (9-octadecenoyl), elaidic acid (9-octadecenoyl), vaccenic acid (11-octadecenoyl), linolic acid (9,12-octadecadienoyl), eleostearic acid (9,11,13-octadecatrienoyl), linolenic acid (9,12,15-octadecatrienoyl), or parinaric acid (9,11,13,15-octadecatetraenoyl) or a residual radical of a synthetic saturated fatty acid such as 2-ethyl-hexylic acid, 2,2'-dimethyloctylic acid, 2-butyloctylic acid or 2-hexyldecylic acid.

The compounds represented by the above described general formula (I) are well known as disclosed in Japanese Patent Publication Nos. 27867/1973 and 28982/1974 but these publications do not show that the compounds are effective and preferable as a lubricant and serve to raise markedly the durability of a magnetic recording medium using as a ferromagnetic substance a magnetic fine powder such as a fine alloy powder having a mean particle diameter of 0.6 μm or less.

Useful examples of the compound represented by the general formula (I) are as follows:

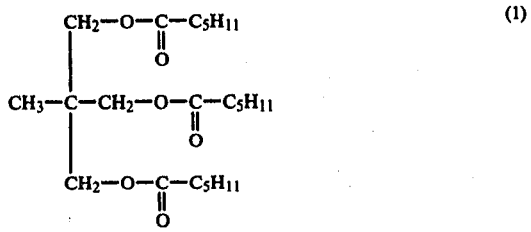

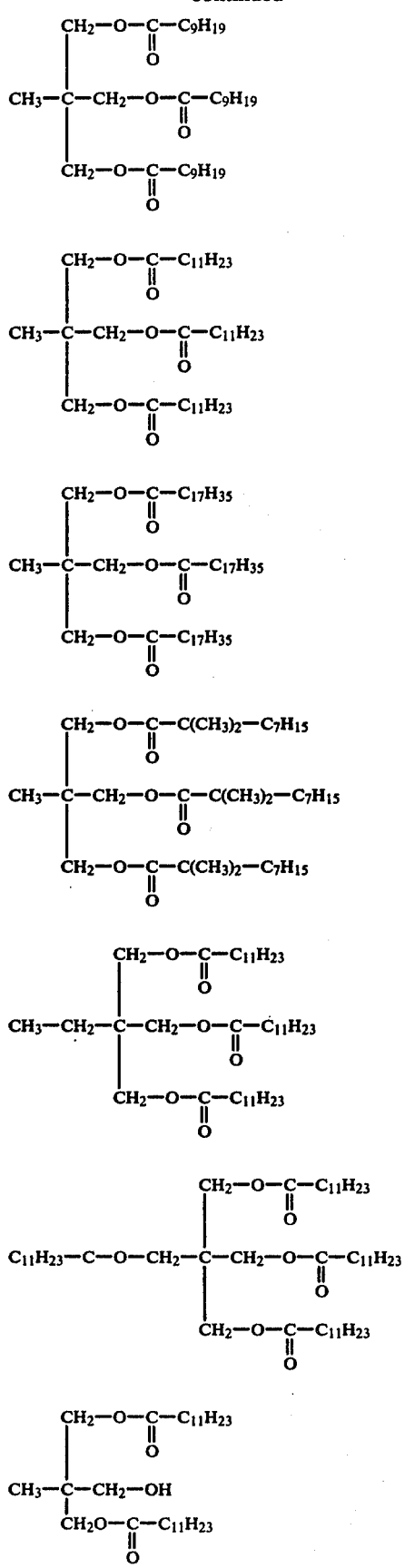
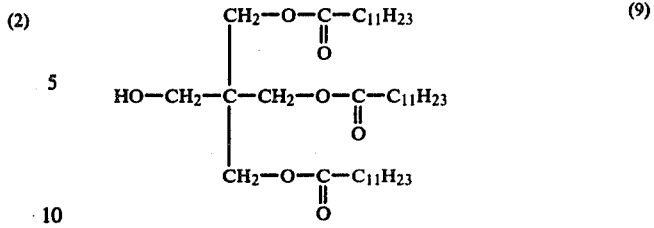

In the above described general formula (I), the saturated or unsaturated hydrocarbon group represented by R' has preferably 5 to 17 carbon atoms, more preferably 5 to 11 carbon atoms. R' may be the same or different. If the number of carbon atoms are more than 17, not only the starting material is hardly obtainable on a commercial scale, but also the effect of lowering the coefficient of kinetic friction is decreased. n represents an integer of from 2 to 4. That is to say, hydroxyl group may remain partly in trimethylolethane, trimethylolpropane and pentaerythritol represented by R.

For the purpose of achieving the object of the present invention, the compound represented by the above described general formula (I) is generally added in a proportion of 0.1 to 5 parts, preferably 0.2 to 3 parts to 100 parts by weight of a ferromagnetic powder. If the quantity of this compound is less than 0.1 part, the coefficient of kinetic friction is not decreased, while if more than 5 parts, not only a blooming phenomenon tends to occur, but also the strength and abrasion resistance of a magnetic layer are lowered.

The compound of the present invention, represented by the foregoing general formula (I), can be synthesized by the known esterification reaction. Synthetic example of Compound (I) by the known method is as follows:

Synthetic Example (Synthesis of Compound (1))

0.8 mol of trimethylolethane was added to 3 mols of caproic acid, to which 0.05 mol of concentrated sulfuric acid was added with agitation, and the mixture was heated for about 3 hours at 150° to 180° C. while removing water formed during the reaction to outside the reaction system. The reaction mixture was subjected to washing with water three to four times to remove the sulfuric acid and then the excessive caproic acid was removed by simple distillation, thus obtaining Compound (1) with a yield of about 90%.

The magnetic recording medium of the present invention can be obtained by kneading or dispersing a ferromagnetic fine powder, binder and compound represented by the general formula (I) in an organic solvent, coating the resulting magnetic coating composition onto a non-magnetic support and drying to form a magnetic layer.

Methods of preparing the magnetic coating composition used in the present invention are described in detail in Japanese Patent Publication Nos. 15/1960, 26794/1964, 180/1968, 28043/1972, 28045/1972, 28046/1972, 28048/1972, 31445/1972, 11162/1973, 21331/1973 and 33683/1973, and Russian Patent No. 308,033. The magnetic coating compositions described in these patents mainly comprise a ferromagnetic powder, a binder and a coating solvent, and in addition, the composition can contain additives such as a dispersing agent, a lubricant, an abrasive, an antistatic agent and the like.

The ferromagnetic fine powder which can be used in the present invention includes ferromagnetic iron oxides, ferromagnetic chromium dioxide, ferromagnetic alloy powders and the like.

The above described iron oxides are ferromagnetic iron oxides represented by FeOx wherein $1.33 \leq x \leq 1.50$, that is, maghemite ($\gamma$-Fe$_2$O$_3$, X=1.50), magnetite (Fe$_3$O$_4$, X=1.33) and their Berthollide compounds (FeOx, 1.33<X<1.50). X can be calculated from the following formula:

$$X = \frac{1}{2 \times 100} \times (2 \times \text{(atomic \% of divalent Fe)} + 3 \times \text{(atomic \% of trivalent Fe)})$$

These ferromagnetic iron oxides can contain one or more of divalent metals such as chromium, manganese, cobalt, nickel, copper and zinc in a proportion of 0 to 10 atomic % based on the iron oxide.

As the above described ferromagnetic chromium dioxide, there can be used, in addition to CrO$_2$, chromium dioxide containing 0 to 20% by weight of one or more of metals such as sodium, potassium, titanium, vanadium, manganese, iron, cobalt, nickel, technetium, ruthenium, tin, cerium and lead, semiconductors such as phosphorus, antimony and tellurium and oxides of these elements.

The above described ferromagnetic iron oxides and ferromagnetic chromium dioxide have preferably an acicular ratio of about 2/1 to 20/1 and a mean length of about 0.2 to 2.0 μm.

The above described ferromagnetic alloy powder contains 75% by weight or more of one or more metallic components. 80% by weight or more of the metallic component consists of one or more of ferromagnetic metals such as Fe, Co, Ni, Fe-Co, Fe-Ni, Co-Ni, and Co-Ni-Fe and 20% by weight or less of the metallic component, preferably, 0.5 to 5% by weight of the metallic component consists of Al, Si, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B and P. In some cases, the ferromagnetic alloy powder contains a small quantity of water, oxides or hydroxides.

The above described ferromagnetic alloy powder consists of acicular particles each having a particle size of about 50 to 1000 Å in which 2 to 20 particles are chained. Examples of the ferromagnetic alloy powder are described in Japanese Patent Publication Nos. 5515/1961, 4825/1962, 5009/1964, 10307/1964, 14090/1969, 18372/1970, 22062/1972, 22513/1972, 28466/1971, 38755/1971, 4286/1972, 12422/1972, 17284/1972, 18509/1972, 18573/1972 and 39639/1973, U.S. Patent Nos. 3,026,215, 3,031,341, 3,100,194, 3,242,005 and 3,389,014, British Pat. Nos. 752,659, 782,762 and 1,007,323, French Pat. No. 1,107,654, and West German patent application (OLS) No. 1,281,334.

Suitable binders which can be used in the present invention include hitherto known thermoplastic resins, thermosetting resins and mixtures thereof.

Suitable thermoplastic resins are those resins which have a softening point of about 150° C. or less, a mean molecular weight of about 10,000 to 200,000 and a degree of polymerization of about 200 to 2,000, for example, a vinyl chloride - vinyl acetate copolymer, a vinyl chloride - vinylidene chloride copolymer, a vinyl chloride - acrylonitrile copolymer, an acrylate - acrylonitrile copolymer, an acrylate - vinylidene chloride copolymer, an acrylate - styrene copolymer, a methacrylate - acrylonitrile copolymer, a methacrylate - vinylidene chloride copolymer, a methacrylate - styrene copolymer, an urethane elastomer, a polyvinyl fluoride, a vinylidene chloride - acrylonitrile copolymer, a butadiene - acrylonitrile copolymer, a polyamide resin, a polyvinyl butyral, cellulose derivatives such as cellulose acetate butyrate, cellulose diacetate, cellulose triacetate, cellulose propionate, nitrocellulose and the like, a styrene - acrylonitrile copolymer, a polyester resin, an amino resin, various synthetic rubber based thermoplastic resins such as polybutadiene, polychloroprene, polyisoprene, styrene - butadiene copolymer and the like and mixtures thereof.

Examples of these resins which can be used are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973 and U.S. Patent Nos. 3,144,352, 3,419,420, 3,499,789 and 3,713,887.

Suitable thermosetting resins have a molecular weight of about 200,000 or less as a coating solution and when heated after coating and drying, the molecular weight becomes infinity due to reactions such as condensation, addition and the like. Of these resins, preferred resins are those resins which do not soften or melt before the resin thermally decomposes.

Examples of these resins are a phenol-formalin novolak resin, a phenol - formalin resol resin, a phenol - furfural resin, xylene - formaldehyde resin, a urea resin, a melamine resin, a drying oil-modified alkyd resin, a phenol resin-modified alkyd resin, a maleic resin-modified alkyd resin, an unsaturated polyester resin, an epoxy resin and hardening agent such as polyamine, acid anhydride, polyamide resin and the like, an isocyanate - terminated polyester moisture-hardening type resin, an isocyanate-terminated polyether moisture-hardening type resin, a polyisocyanate prepolymer such as a compound having three or more isocyanate groups in one molecule obtained by reacting a diisocyanate with a low molecular weight triol, a trimer and a tetramer of diisocyanates, a polyisocyanate prepolymer and a resin having active hydrogen such as polyester polyol, a polyether polyol, acrylic acid copolymer, maleic acid copolymer, 2-hydroxyethyl methacrylate copolymer, p-hydroxystyrene and the like, and mixtures thereof.

Suitable examples of these resins are described in Japanese Patent Publication Nos. 8103/1964, 9779/1965, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/2972 and 28922/1972, U.S. Pat. Nos. 3,144,353, 3,320,090, 3,437,510, 3,597,273, 3,781,210, 3,781,211, etc.

These binders can be used individually or in combination with each other and other additives can be added to the binders. The mixing ratio by weight of the ferromagnetic powder and the binder is 10 to 100 parts by weight, preferably 12 to 50 parts by weight of the binder per 100 parts by weight of the ferromagnetic powder.

In addition to the above described binder and ferromagnetic fine powder, additives such as a dispersing agent, a lubricant, an abrasive, an antistatic agent and the like can be used in the magnetic recording layer.

Suitable dispersing agents are fatty acids containing about 12 to 18 carbon atoms (e.g., having the formula $R_1COOH$ wherein $R_1$ is an alkyl or alkenyl group containing about 11 to 17 carbon atoms), for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; fluorine-containing compounds of the above described fatty acid esters; amides of the above described fatty acids; alkylphosphoric acid esters of polyalkylene oxides; lecithin; trialkylpolyolefinoxy quaternary ammonium salts (alkyl group having 1 to 5 carbon atoms and olefin being ethylene or propylene), etc. In addition, higher alcohols containing about 12 or more carbon atoms and the sulfates thereof can be used. These dispersing agents are generally used in a proportion of about 0.5 to 20 parts by weight to 100 parts by weight of the binder. Suitable dispersing agents are described in Japanese Patent Publication Nos. 28369/1964, 17945/1969, 7441/1973, 15001/1973, 15002/1973, 16363/1973 and 4121/1975 and U.S. Pat. Nos. 3,387,993 and 3,470,021. The additives of the present invention can be used together with these dispersing agents without deteriorating the effects of these dispersing agents.

In addition to the lubricant represented by the general formula (I) according to the present invention, the commonly used lubricant can optionally be added. Useful examples of such a lubricant are electrically conductive powders such as graphite and the like; inorganic fine powders such as molybdenum disulfide, tungsten disulfide and the like; plastic fine powders such as polyethylene, polypropylene, ethylene - vinyl chloride copolymer, polytetrafluoroethylene and the like; $\alpha$-olefin polymers; unsaturated aliphatic hydrocarbons being liquid at room temperature (compounds wherein the double bond of $\alpha$-olefin is combined with the terminal carbon, the number of carbons: about 20); and fatty acid esters of monobasic fatty acids having 12 to 20 carbon atoms and monohydric alcohols having 3 to 12 carbon atoms. These lubricants are generally used in a proportion of about 0.2 to 20 parts by weight per 100 parts by weight of the binder. These lubricants are described in Japanese Patent Publication Nos. 18064/1966, 23889/1968, 40461/1971, 15621/1972, 18482/1972, 28043/1972, 32001/1972 and 5042/1975 and U.S. Patent Nos. 3,470,021, 3,492,235, 3,497,411, 3,523,086, 3,625,760, 3,630,772 and 3,642,539, "IBM Technical Disclosure Bulletin", Vol. 9, No. 7, page 779 (December 1966), and "ELECTRONIK," No. 12, page 380 (1961).

Typical abrasive agents which can be used in the present invention include materials generally used, e.g., fused alumina, silicon carbide, chromium oxide ($Cr_2O_3$), corundum, synthetic corundum, diamond, synthetic diamond, garnet, emery (main component:corundum and megnetite) and the like. Those abrasive agents are used which have a Mohs' hardness of 5 or more and a mean particle size of about 0.05 to 5 $\mu m$, preferably about 0.1 to 2 $\mu m$. These lubricants are generally used in a proportion of from about 0.5 to 20 parts by weight per 100 parts of the binder. These abrasive agents are described in, for example, Japanese Patent Publication Nos. 18572/1973, 15003/1973, 15004/1973 (U.S. Pat. No. 3,617,378), 39402/1974 and 9401/1975, U.S. Pat. Nos. 3,007,807, 3,041,196, 3,293,066, 3,630,910 and 3,687,725, British Pat. No. 1,145,349 and West German Pat. (DT-PS) Nos. 853,211 and 1,101,000. The joint use of these abrasive agents with the additive of the present invention results in decrease of the head abrasiveness due to the abrasive agents.

Antistatic agents which can be used in the present invention include electrically conductive fine powders such as of carbon black, graphite, carbon black-grafted polymers and the like; natural surface active agents such as saponin and the like: nonionic surface active agents such as alkylene oxide based, glycerin based, glycidol based surface active agents and the like; cationic surface active agents such as higher alkylamines, quaternary ammonium salts, pyridine or other heterocyclic compounds, phosphoniums, sulfoniums and the like; anionic surface active agents containing acid groups such as carboxylic acid groups, sulfonic acid groups, phosphoric acid groups, sulfate groups, phosphate groups and the like; and amphoteric surface active agents such as sulfates or phosphates of amino acids, amino sulfonic acids and amino alcohols and the like; etc.

The above described electrically conductive fine powder is generally used in a proportion of 0.2 to 20 parts by weight to 100 parts by weight of the binder and the surface active agent is generally used in a proportion of 0.1 to 10 parts by weight to 100 parts by weight of the binder.

Examples of the electrically conductive fine powders and surface active agents that can be used as antistatic agents are described in, for example, Japanese Patent Publication Nos. 22726/1971, 24881/1972, 26882/1972, 15440/1973 and 26761/1973, U.S. Patent Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German patent application (OLS) No. 1,942,665, British Patent Nos. 1,077,317 and 1,198,450, Ryohei Oda et al., "Kaimen Kassei Zai no Gosei to so no Oyo (Synthesis of Surface Active Agents and their Applications)," Maki Shoten, Tokyo (1964), A. M. Schwarts et al., "Surface Active Agents," Interscience Publications Corp., New York (1958), J. P. Sisley et al., "Encyclopedia of Surface Active Agents," Vol. 2, Chemical Publishing Co., New York, "Kaimen Kassei Zai Binran (Handbook of Surface Active Agents)", 6th Ed., Sangyo Tosho Co., Tokyo, Dec. 20, 1966, etc.

These surface active agents can be used individually or in combination with each other. These surface active agents are generally used as antistatic agents, but in some cases, they are used for other purposes, for example, for improving dispersibility, magnetic properties, and lubricity, or as auxiliary coating agents.

Formation of the magnetic recording layer of the present invention is carried out by dissolving, kneading or dispersing the above described composition in an organic solvent and then coating the resulting coating composition onto a non-magnetic support, followed by drying. After the coating but before the drying, this magnetic layer can be subjected to a treatment for orienting the magnetic powder in the layer and if desired, the magnetic layer can be subjected to a surface-smoothening treatment after the drying.

Suitable materials which can be used for producing the non-magnetic support are plastics, for example, polyesters such as polyethylene terephthalate, polyethylene-2,6-napthalate and the like, polyolefins such as polypropylene and the like, cellulose derivatives such as cellulose triacetate, cellulose diacetate and the like, polycarbonates, etc., nonmagnetic metals such as copper, aluminum, zinc and the like, and ceramics such as glass, porcelain, earthenware and the like.

The shape of such a non-magnetic support can be chosen from any of tapes, films, sheets, disks, cards and drums and the material thereof can be optionally chosen from the above described various materials depending on the shape. The thickness of the non-magnetic support is from about 2 to 50 μm, preferably 3 to 25 μm in the case of films, tapes or sheets and about 0.5 to 10 mm in the case of disks or cards. In the case of drums, a suitable cylindrical form is chosen depending on a recorder used.

The above described non-magnetic support can be subjected to the so-called back doating of the surface opposite to that having the magnetic layer thereon, for the purpose of preventing generation of static charging, magnetic print through, wow and flutter and so on in the case of flexible supports such as films, tapes, sheets, thin flexible disks and the like. Suitable back coating techniques which can be used are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 and 3,761,311.

The ferromagnetic powders, binders, dispersing agents, lubricants, abrasives, antistatic agents, solvents, etc., as described above, are mixed and kneaded to prepare magnetic coating compositions. In the kneading, the magnetic powder and other components are charged in a kneading machine simultaneously or separately. For example, in one method, a ferromagnetic fine powder is added to a solvent containing a dispersing agent and kneaded in a predetermined time to prepare a magnetic coating composition. For the kneading and dispersing of such a magnetic coating composition, there can be used various kneading machines such for example as two roll mills, three roll mills, ball mills, pebble mills, trommels, sand grinders, Szegvari attriters, high speed impeller dispersing machines, high speed stone mills, high speed impact mills, dispersing kneaders, high speed mixers, homogenizers, ultrasonic dispersing machines and the like. Suitable kneading or dispersing techniques are described in, for example, T. C. Patton, "Paint Flow and Pigment Dispersion" (published by John Wiley & Co., 1964) and U.S. Pat. Nos. 2,581,414 and 2,855,156.

The magnetic recording layer can be coated on the support using coating methods such as air doctor coating, blade coating, air knife coating, squeeze coating, dip coating, reverse roll coating, transfer roll coating, gravure coating, kiss coating, cast coating, spray coating and the like and other methods can also be used. These methods are described in, for example, "Coating Kogaku (Coating Engineering)," pages 253 to 277, published by Asakura Shoten, Tokyo (Mar. 20, 1971).

In the magnetic recording medium of the present invention, a magnetic layer is coated on a non-magnetic support by the above described coating method and then dried. In some cases, two or more magnetic layers can be provided by a continuous operation repeating this process or by a simultaneous multilayer coating method as described in, for example, Japanese Patent Application (OPI) Nos. 98803/1973 (West German Patent Application (OLS) No. 2,309,159) and 99233/1973 (West German Patent (DT-AS) No. 2,309,158).

Typical organic solvents which can be used in the coating include ketones such as acetone, methyl ethyl ketone, methyl isobutyl ketone, cyclohexane and the like; alcohols such as methanol, ethanol, propanol, butanol and the like; esters such as methyl acetate ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; and chlorinated hydrocarbons such as methylene chloride, ethylene chloride, carbon tetrachloride, chloroform, ethylene chlorohydrin, dichlorobenzene and the like. These solvents can be used individually or in combination with each other.

The magnetic layer coated on the support by the above described method is dried after, if desired, the coating has been subjected to a treatment for orienting the magnetic powder in the layer. If required, the magnetic layer can be subjected to a surface-smoothening treatment or can be cut to the desired shape, thereby to form the magnetic recording substance of the present invention. In particular, it is found in the present invention that a magnetic recording medium having a smooth surface and excellent abrasion resistance can be obtained through the surface smoothening treatment of the magnetic recording layer.

In the orienting treatment for the magnetic layer, the orienting magnetic field can be either an AC or DC magnetic field with a field strength of about 50 to 10000 Oe. The drying temperature of the magnetic layer can range from about 50° to 120° C., preferably 70° to 100°, more preferably 80° to 90° C., the air flow rate is 1 to 5 Kl/m$^3$/min, preferably 2 to 3 Kl/m$^3$/min and the drying time is about 30 seconds to 10 minutes, preferably 1 to 5 minutes. The orienting direction of the magnetic substance is determined depending upon the intended use thereof. That is to say, the direction is parallel to the lengthwise direction of tape in the case of sound tapes, small sized video tapes and memory tapes and inclined by about 30 to 90 degrees to the lengthwise direction in the case of broadcasting video tapes.

Suitable orienting methods of magnetic powders are disclosed in, for example, U.S. Pat. Nos. 1,949,840, 2,796,359, 3,001,891, 3,172,776, 3,416,949, 3,473,960 and 3,681,138 and Japanese Patent Publication Nos. 3427/1957, 28368/1964, 23624/1965, 23625/1965, 13181/1966, 13043/1973 and 39722/1973. The orienting directions of the upper layer and lower layer can be made different as disclosed in West German Patent (DT-AS) No. 1,190,985.

The surface-smoothening treatment of the magnetic layer after drying is carried out by a calendering treatment or the like. In the case of such a calendering treatment, in particular, the magnetic layer is passed through between a metal roll and a cotton roll or a synthetic resin (e.g., nylon) roll according to the supercalendering method. The supercalendering conditions are generally a roll pressure of about 25 to 100 Kg/cm$^2$, preferably 30 to 70 Kg/cm$^2$, a temperature of about 35° to 100° C. and a treatment speed of 5 to 120 m/min. If the pressure and temperature exceed the upper limit thereof, the magnetic layer and non-magnetic support are unfavourably affected, while if the treatment speed is less than about 5 m/min, the surface-smoothening effect cannot be attained and if more than 120 m/min, the operation is difficult. These surface-smoothening treatments are described in U.S. Pat. Nos. 2,688,567, 2,998,325 and 3,783,023, West German patent application (OLS) No. 2,405,222 and Japanese patent application Nos. 53631/1974 and 10337/1975.

According to the present invention, the running property and durability of not only a magnetic recording medium using a metal oxide powder as a ferromagnetic substance but also a magnetic recording medium using an alloy fine powder can remarkably be improved by adding the lubricant of the present invention. In the latter case, in particular, it has hiterto been considered difficult to satisfy these properties.

In the magnetic recording medium using the lubricant of the present invention, the head abrasion is reduced to half of magnetic recording media of the prior art and the tape running property is not deteriorated even at a high temperature and a high humidity, for example, at least 40° C. and at least 80% RH.

The present invention will be explained in detail with reference to the following examples and comparative examples. It will be obvious to one skilled in the art that various changes and modifications can be made in the components, ratios, operational order and the like without departing from the spirit of the present invention. Therefore, the present invention should not be construed as being limited to the following examples. All parts, percents ratios and the like are by weight unless otherwise indicated.

EXAMPLE 1

| Magnetic Coating Composition A | |
|---|---|
| Co-containing Berthollide Iron Oxide<br>FeO$_{1.4}$ containing 1.5 atomic % Co<br>Hc : 610 Oe, Particle Length : 0.6 μm<br>Acicular Ratio : 10/1 | 300 parts |
| Vinyl Chloride/Vinylidene Chloride Copolymer<br>Copolymerization Ratio (mole) : 7/3<br>Degree of Polymerization : about 300 | 27 parts |
| Polyesterpolyurethane<br>Reaction Product of Polyethylene Adipate<br>and 4,4'-Diphenylmethane Diisocyanate<br>Mean Molecular Weight: about 130,000<br>(corresponding to styrene weight) | 28 parts |
| Soybean Lecitin | 3 parts |
| Lubricant (shown in Table 1) | 3 parts |
| Butyl Acetate | 500 parts |
| Methyl Ethyl Ketone | 200 parts |

The above described composition was charged in a ball mill, kneaded or dispersed for 24 hours, mixed with 14 parts of a polyisocyanate compound (Desmodur L-75, manufactured by Bayer AG, 75 weight % solution of adduct of 1 mol of trimethylolpropane and 3 mols of tolylene diisocyanate in ethyl acetate) and then subjected to dispersion under high speed shearing for 2 hours. After this treatment, the mixture was filtered by means of a filter having a mean pore diameter of 3 μm to obtain a magnetic coating composition A.

The resulting magnetic coating composition A was coated on a polyethylene terephthalate film having a thickness of 22 μm to give a thickness of 6 μm on dry base by doctor coating, subjected to orienting in a DC magnetic field with 2500 Oe for 0.02 second, dried at 100° C. for 2 minutes at an air flow rate of 3 Kl/m³/min and then subjected to a supercalendering treatment at a temperature of 60° C., a pressure of 60 Kg/cm and a speed of 40 m/min, thus obtaining a wide magnetic recording film. This film was then slit to obtain a vido tape with a width of ½ inch.

The lubricants used in the magnetic coating composition A (C Nos.: Comparative Examples) and the properties of these video tapes are shown in Table 1.

Table 1

| Sample Nos. | Lubricants | Coefficient of Kinetic Friction[1] | | Durability[2] (min) |
|---|---|---|---|---|
| | | Load 100 g | Load 200 g | |
| 1 | (1) | 0.27 | 0.33 | 70 |
| 2 | (2) | 0.25 | 0.31 | 75 |
| 3 | (3) | 0.22 | 0.30 | 90 |
| 4 | (4) | 0.28 | 0.35 | 60 |
| 5 | (5) | 0.20 | 0.31 | 100 |
| 6 | (6) | 0.22 | 0.32 | 90 |
| 7 | (7) | 0.22 | 0.31 | 95 |
| 8 | (8) | 0.21 | 0.33 | 95 |
| 9 | (9) | 0.21 | 0.30 | 100 |
| C-1 | Lauric Acid | 0.40 | — | 20 |
| C-2 | Amyl Laurate | 0.37 | — | 35 |
| C-3 | Lauric Acid Glyceride | 0.38 | — | 45 |
| C-4 | — | 0.53 | — | 5 |

Note:
[1]Coefficient of Kinetic Friction
Measured value of each sample using a measuring apparatus as shown in the accompanying drawing (In Sample Nos. C1–C4, the measurement is impossible when the load is 200 g due to too large coefficient of kinetic friction.) In the accompanying drawing, A is a Y-alloy Cu 1–4.5% Mg 0.5–2.0%, Ni 0.5–2.3%, Fe 0–1%, Al balance) drum of 115.8 mm in diameter whose surface is polished and a sample tape B is rubbed at a relative speed of 19.0 cm/sec by the rotaton of this drum at 31.4 rpm (corresponding to the friction condition of a tape and a drum in an EIAJ Type I VTR-Electronic Industries Association of Japan-). C is a tension detecting section and D is a weight to give a tension to a tape. The coefficient of kinetic friction is calculated by the following formula, Coefficient of Kinetic Friction $(\mu) = \frac{1}{\pi} \ln \frac{W}{W_o}$ wherein $W_o$ is a load by a weight D and W is a tension detected by C. The measurement is carried out at a load of 100 g and 200 g.
[2]Durability (min)
Using an EIAJ type I VTR (AV-8700 Type, manufactured by SONY CORP.), a test pattern is recorded, a still (stopmotion) mode is reproduced and a period of time until an abnormal condition appears in the TV image is measured.

EXAMPLE 2

| Magnetic Coating composition | |
|---|---|
| Fe—Co—Cr (70 : 25 : 5) Alloy Fine Powder)<br>(containing about 3 % by weight of B,<br>Hc = 950 Oe, mean particle size: 400 A,<br>Mean particle chain: 10–15 particles) | 300 parts |
| Polyesterpolyurethane<br>(same as in Magnetic Coating Composition A) | 20 parts |
| Synthetic Nondrying Oil Modified Alkyd Resin<br>(Reaction Product of Glycerol, Phthalic Anhydride<br>and Synthetic Nondrying Oil, oil length: 29%,<br>Hydroxyl value: about 130) | 25 parts |
| Oleic Acid | 3 parts |
| Lubricant (shown in Table 2) | 3 parts |
| Butyl Acetate | 600 parts |

The above described composition was charged in a ball mill, kneaded or dispersed for 24 hours, mixed with 20 parts of a polyisocyanate compound (Desmodur L-75, Cf. Example 1) and then subjected to dispersion under high speed shearing for 1 hour. After this treatment, the mixture was filtered through a filter having a mean pore diameter of 3 μm to thus obtain a magnetic coating composition B.

The resulting magnetic coating composition B was coated on a polyethylene terephthalate film having a thickness of 22 μm to give a thickness of 3 μm on dry base by doctor coating, subjected to orienting in a DC magnetic field with 2500 Oe for 0.02 second, dried at 100° C. and an air flow rate of 2 Kl/m³/min for 2 minutes and then subjected to a supercalendering treatment at a temperature of 60° C., a pressure of 60 Kg/cm and a speed of 40 m/min, thus obtaining a wide magnetic recording film. This film was then slit to obtain a video tape with a width of ½ inch.

The lubricants used in the magnetic coating composition B (C Nos.: Comparative Examples) and the properties of these video tapes are shown in Table 2.

Table 2

| Sample Nos. | Lubricants | Coefficient of Kinetic Friction[1] | | Durability[2] (min) |
|---|---|---|---|---|
| | | Load 100 g | load 200 g | |
| 10 | (1) | 0.30 | 0.37 | 50 |
| 11 | (2) | 0.28 | 0.33 | 60 |
| 12 | (3) | 0.25 | 0.31 | 75 |
| 13 | (4) | 0.30 | 0.39 | 40 |
| 14 | (5) | 0.23 | 0.31 | 80 |
| 15 | (6) | 0.26 | 0.33 | 70 |
| 16 | (7) | 0.25 | 0.32 | 80 |
| 17 | (8) | 0.24 | 0.35 | 80 |
| 18 | (9) | 0.24 | 0.33 | 85 |
| C-5 | Lauric Acid | 0.43 | — | 1 |
| C-6 | Amyl Laurate | 0.39 | — | 15 |
| C-7 | Lauric Acid Glyceride | 0.39 | — | 25 |
| C-8 | — | 0.52 | — | 0.1 |

Note: [1] and [2] (Cf. Table 1)

It will clearly be understood from the results of Examples 1 and 2 as shown in Tables 1 and 2 that the compound represented by the general formula of the present invention shows a low coefficient of kinetic friction which has hiterto been difficult to obtain in the magnetic recording medium using fatty acids and fatty acid esters and, moreover, gives a very excellent durability.

In particular, as can be seen from Table 2, the lubricant of the present invention raises remarkably the durability of a magnetic recording medium using an alloy fine powder as a ferromagnetic substance.

EXAMPLE 3

The procedure of Example 1 was repeated except changing the quantity of the lubricant (4) in the magnetic coating composition A as shown in Table 3, thus obtaining video tapes with a width of ½ inch. The properties of the video tapes are shown in Table 3:

Table 3

| Sample Nos. | Amount of Lubricant(4) (parts) | Coefficient of Kinetic Friction[1] | | Durability[2] (min) |
|---|---|---|---|---|
| | | Load 100 g | Load 200 g | |
| 19 | 0.2 | 0.48 | — | 1 |
| 20 | 0.6 | 0.20 | 0.30 | 100 |
| 4 | 3 | 0.28 | 0.35 | 60 |
| 21 | 9 | 0.31 | 0.39 | 40 |
| 22 | 16 | 0.37 | 0.49 | 20 |

Note: [1] and [2] (Cf. Table 1)

As can be seen from these results, when the amount of the lubricant of the present invention is increased, the coefficient of friction is lowered and the durability is increased (Sample No. 21), but, when the amount of the lubricant is further increased, blooming of the lubricant is increased and the coefficient of friction and durability are deteriorated (Sample No. 22). On the other hand, even if the amount of the lubricant is decreased, a sufficient lubricating effect and durability are given, thus serving to lower the production cost of the magnetic recording medium (Sample No. 20), but if the amount of the lubricant is too small, the lubricating effect and durability are deteriorated (Sample No. 19).

What is claimed is:

1. A magnetic recording medium having on a non-magnetic support a magnetic layer comprising a ferromagnetic powder dispersed in a binder, in which the magnetic layer contains a compound represented by the following general formula (I), $$R \text{\textemdash}( O \text{\textemdash} \underset{\underset{O}{\|}}{C} \text{\textemdash} R' )_n \qquad (I)$$

wherein R represents a residual radical of trimethylolethane, trimethylolpropane or pentaerythritol, R' represents a residual radical of a fatty acid having at least 5 carbon atoms and n represents an integer of 2 to 4 said compound (I) being present in a proportion of 0.1 to 5 parts by weight to 100 parts by weight of ferromagnetic powder.

2. The magnetic recording medium as claimed in claim 1, wherein R' is an alkyl group having 5 to 17 carbon atoms.

3. The magnetic recording medium as claimed in claim 1, wherein R' is an alkenyl group having 5 to 17 carbon atoms.

4. The magnetic recording medium as claimed in claim 1, wherein the ferromagnetic powder consists of at least one member selected from the group consisting of ferromagnetic iron oxides, ferromagnetic chromium dioxide and ferromagnetic alloy powders.

5. The magnetic recording medium as claimed in claim 4, wherein the ferromagnetic iron oxides are represented by the general formula $FeO_x$ wherein $1.33 \leq x \leq 1.50$.

6. The magnetic recording medium as claimed in claim 4, wherein the ferromagnetic iron oxides contain 0 to 10 atomic % of at least one metal selected from the group consisting of Cr, Mn, Co, Ni, Cu and Zn.

7. The magnetic recording medium as claimed in claim 4, wherein the ferromagnetic chromium dioxide contains 0 to 20% by weight of at least one metal selected from the group consisting of Na, K, Ti, V, Mn, Fe, Co, Ni, Tc, Ru, Sn, Ce, Pb, P, Sb, Te and oxides thereof.

8. The magnetic recording medium as claimed in claim 4, wherein the ferromagnetic alloy powder contains at least 75% by weight of at least one metal selected from the group consisting of Fe, Co, Ni, Fe-Co, Fe-Ni, Co-Ni and Fe-Co-Ni.

9. The magnetic recording medium as claimed in claim 1, wherein the binder is at least one material selected from the group consisting of thermoplastic resins and thermosetting resins.

10. The magnetic recording medium as claimed in claim 1, wherein the binder is used in a proportion of 10 to 100 parts by weight to 100 parts by weight of the ferromagnetic powder.

11. The magnetic recording medium as claimed in claim 1, wherein the magnetic layer further contains additives selected from the group consisting of dispersing agents, lubricants, abrasives and antistatic agents.

12. The magnetic recording medium as claimed in claim 1, wherein the non-magnetic support is of a material selected from the group consisting of polyethylene terephthalate, polyethylene-2,6-naphthalate, polypropylene, cellulose triacetate, cellulose diacetate, polycarbonate, copper, aluminum, zinc, glass and ceramics.

13. The magnetic recording medium as claimed in claim 1, wherein the non-magnetic support is a film, tape or sheet having a thickness of 2 to 50 μm.

14. The magnetic recording medium as claimed in claim 1, wherein the non-magnetic support is a disk or card having a thickness of 0.5 to 10 mm.

* * * * *